March 29, 1955   D. C. MULLER   2,705,073
CONVEYOR

Filed Nov. 10, 1952   2 Sheets-Sheet 1

INVENTOR
DONALD C. MULLER
BY

ATTORNEYS

March 29, 1955  D. C. MULLER  2,705,073
CONVEYOR

Filed Nov. 10, 1952  2 Sheets-Sheet 2

INVENTOR
DONALD C. MULLER
BY
ATTORNEYS

United States Patent Office 2,705,073
Patented Mar. 29, 1955

2,705,073

CONVEYOR

Donald C. Muller, Whittier, Calif., assignor to A. J. Bayer Company, Los Angeles, Calif., a corporation of California Application November 10, 1952, Serial No. 319,683

3 Claims. (Cl. 209—125)

This invention relates to conveyors and has more particularly to do with conveyors adapted for use in conveying such articles as fruit and produce past sorting stations at which selected articles are removed and placed in a crate, for instance, and culls or defective articles are removed and placed in a separate place for ultimate disposal.

It is an object of the invention to provide in a conveyor of this character novel means for facilitating the sorting and removal of culls or defective articles. Another object is to provide improved means for propelling and guiding the conveyor pallets in their travel around a continuous path.

Figure 1:
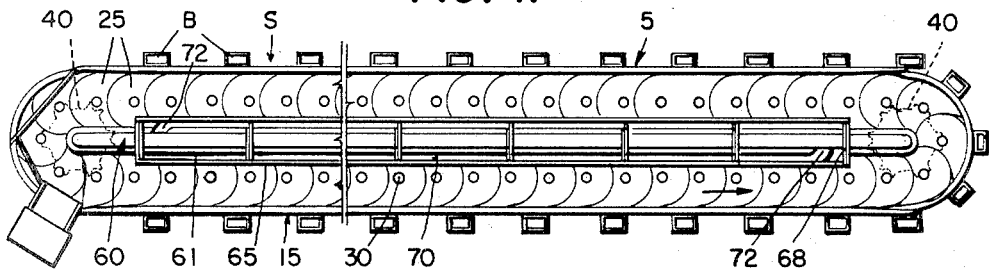
Figure 2:
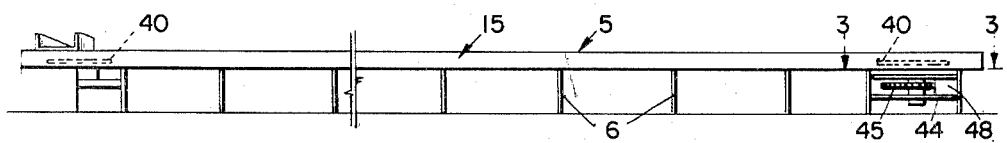
Figure 3:
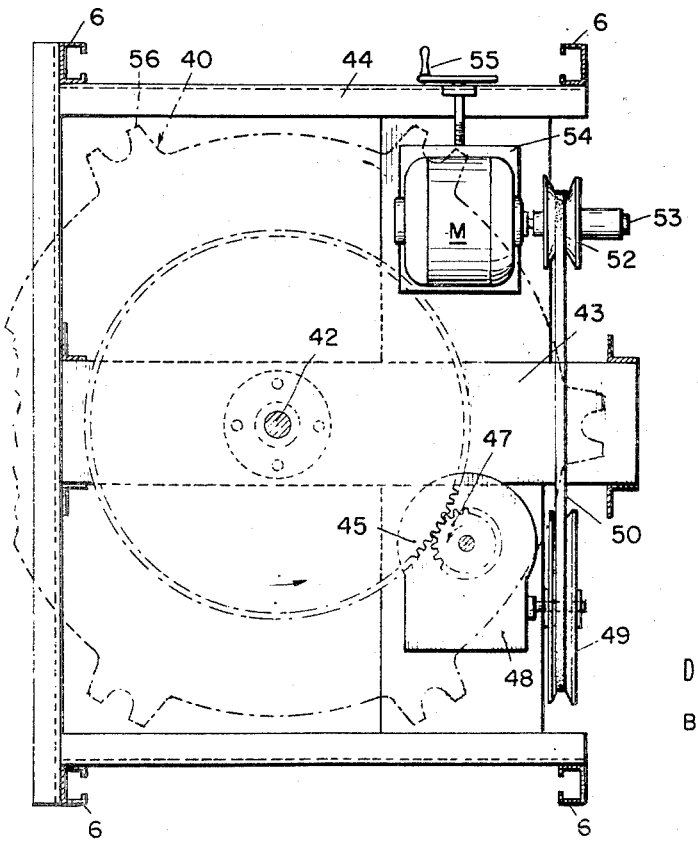
Figure 4:
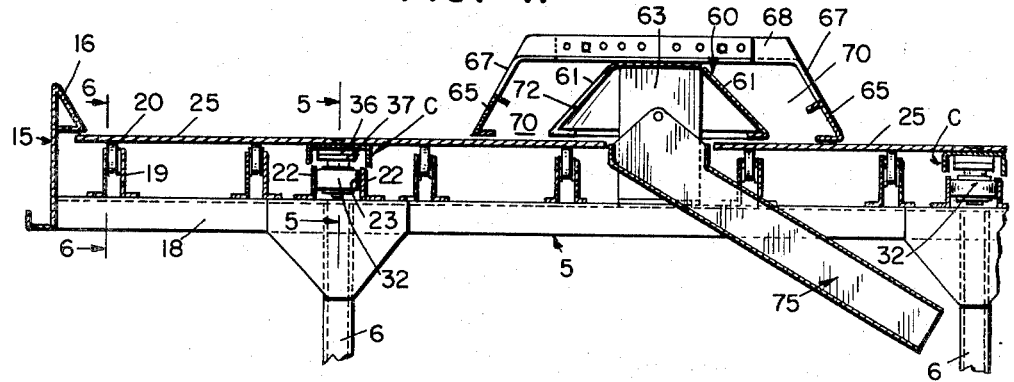
Figure 5:
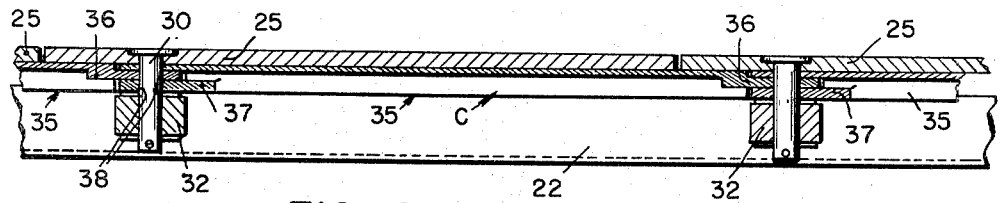
Figure 6:
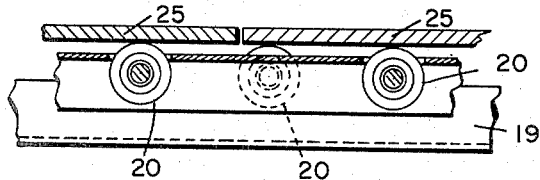
Figure 7:
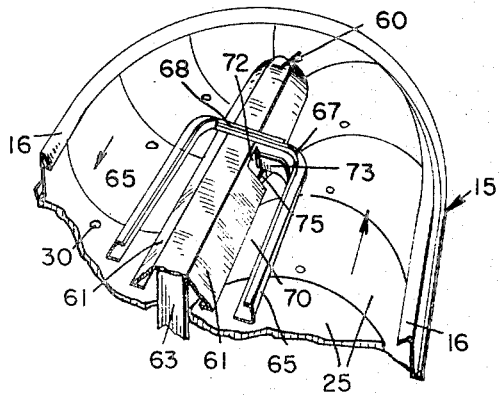

Other objects and advantages will appear from the following description of a preferred embodiment of the invention, for which purpose I shall refer to the accompanying drawings wherein:

Fig. 1 is a top plan view;
Fig. 2 is a side elevation;
Fig. 3 is a plan section taken on line 3—3 of Fig. 2;
Fig. 4 is an enlarged fragmentary section;
Fig. 5 is an enlarged fragmentary section taken on line 5—5 of Fig. 4;
Fig. 6 is an enlarged fragmentary section taken on line 6—6 of Fig. 4;
Fig 7 is a perspective showing an end portion of my conveyor.

In general, in carrying out my invention, I provide a table which has a continuous conveyor run and for this run I provide a conveyor composed of a plurality of substantially crescent-shaped flat pallets pivotally carried by suitable linkage comprising a belt, driven by a sprocket wheel. Of particular importance is the fact that along the center portion of the table I provide partition walls overlying and spaced from the pallets, which walls define cull-receiving guideways or compartments into which culls or defective articles may be placed and then conveyed by the pallets to a disposal point.

Referring now to the drawings, I show at 5 a table supported by legs 6. A continuous side wall 15 is fixed to the table structure in position surrounding the top edge of the table, the upper end of the wall 15 terminating in a portion 16 of triangular cross-section (Fig. 4). In use, there are normally disposed around the table in spaced relation a number of packing boxes B supported by suitable tables (not shown), and the space between contiguous boxes defines sorting stations S, in each of which a worker may stand in position to have convenient access to the table.

The table structure has a plurality of channeled cross-members 18 which mount brackets 19 rotatably supporting rollers 20. Also, the cross-members fixedly carry a pair of parallel spaced angle iron guide members 22 defining therebetween a continuous guideway 23 extending around and spaced inwardly from the sides of the table.

A plurality of flat, substantially crescent-shaped pallets 25 are supported in intermeshing relation around the table upon the rollers 20. The pallets may be of any suitable material, such, for instance, as plywood or metal. Each pallet is pivotally mounted upon a continuous belt, generally designated C, by means of a pin 30 which extends through a hole in the belt and carries a roller 32 at its lower end.

The continuous belt C is comprised of a plurality of elongated channel iron links 35. One link of each contiguous pair has a plate 36 welded or otherwise secured to one of its ends and a plate 37 likewise secured to its other end, while the other link of each contiguous pair has like plates secured to its respective ends. Each of said plates has a hole 38 to pass one of the pins 30. Thus, through the interconnection of the links by the pins, the belt is continuous.

As will be observed from Fig. 4, the rollers 32 travel along the continuous guideway 23 while being supported by the rollers 20. To move the belt and, through them the pallets, I provide at each end of the table a sprocket wheel 40 mounted upon a shaft 42 journaled in a cross-member 43 of a frame 44 supported upon the legs 6. In one of the sprocket assemblies, a gear 45 is secured to shaft 42 and a pinion 47 meshes therewith, the pinion being driven, through a conventional speed-reducing unit 48, by a V-pulley 49 which, in turn, is driven by a V-belt 50 from a conventional variable diameter sheave 52. The sheave 52 is fixed on a shaft 53 driven by a motor M. Shaft 53 is journaled in a bearing (not shown) which is slidably mounted in a slot (not shown) in frame 44. The motor is also supported upon a slidable base 54 which may be adjustably moved by a crank and screw control unit 55. Thus, as the motor base is adjusted, the sheave, which is of the automatically adjustable type, will adjust itself to change its effective diameter. In practice, I find it necessary only to power-drive one of the sprocket wheels, although there is one at each end of the table. Each sprocket has circumferentially spaced teeth 56 so spaced apart as to register with and engage the respective rollers 32. Other well-known means for driving the belt C may be provided, since the particular driving means forms no essential part of my present invention.

Longitudinally along the center of the table, I mount an island structure comprising a somewhat V-shaped wall member 60 providing upwardly and inwardly inclining side wall portions 61. Member 60 is supported above and in spaced relation to the pallets by means of uprights 63 fixed at one end to the cross-members 18 and at their other ends secured to the member 60.

Also, in spaced parallel relationship to said wall portions 61, I provide division walls 65 which are suspended in position spaced above the pallets by webs 67 formed integrally with cross-member 68 mounted upon wall member 60.

It will be observed that walls 65, 61 and the top surface of the pallets together define two guideways or compartments 70 (one at each side of the island structure) for the reception of culls or defective articles; the culls, after being placed in said guideways, being moved therealong by the pallets. At one end of each of the guideways I provide an opening 72 in wall 61 and provide division walls 65 with a curved deflecting surface 73 to deflect culls from the guideway 70 into the opening 72 from whence the culls drop into a discharge chute 75 (Figs. 4 and 7). A like arrangement is provided for the other guideway 70 at the other end of the table.

From the foregoing it will be observed that the guideways, a part of each of which is defined by the underlying pallets themselves, render it possible for the workers standing at the various sorting stations S conveniently to throw culls from the fruit or produce being conveyed in the continuous path around the table by the pallets into the cull-receiving guideways or compartments, while the undiscarded articles may be removed from the pallets and placed in the packing boxes along the table. The culls from the guideways 70 are then automatically moved through the openings 72 by the pallets and discharged by the chute 75 into suitable receptacles (not shown).

I claim:
1. In a sorting device, a table having sorting stations around its side, a wall surrounding the outer edge of the top of the table, a conveyor mounted for movement in a continuous path along the top of the table and including two parallel, laterally spaced runs, said conveyor being adapted to receive and convey articles to be sorted, means for so moving said conveyor, and second wall means disposed longitudinally along the center of the top portion of the table and defining a pair of par- allel, open-topped passageways extending longitudinally of the table one over the inner marginal area of each run of the conveyor, means supporting said second wall means above said conveyor; and means providing a discharge outlet between the runs of the conveyor at one end of each of said passageways.

2. In a sorting device, a substantially rectangular table, having sorting stations spaced apart along its sides, an upright wall surrounding and extending upwardly above the plane of the top of the table, a continuous belt mounted on the table to travel along the table in runs paralleling the sides thereof, a plurality of substantially crescent-shaped pallets pivotally mounted on said belt in intermeshing relationship for rotation relative to each other and relative to the belt, a stationary island member extending longitudinally of the table midway between its sides, said island member comprising walls extending upwardly above underlying marginal portions of said pallets and defining therewith a pair of article receiving, closed ended passageways extending longitudinally of the table, and means providing a discharge passageway at one end of each of said passageways.

3. In a device for use in sorting culls from produce and the like, a table having sorting stations along its sides, walls surrounding the outer edge of the top of the table, a continuous conveyor belt mounted to have a run along one side of the table and a reverse run along the opposite side of the table, produce-supporting pallets pivotally carried by said belt, an inverted, substantially V-shaped island member extending longitudinally medially along the top of the table above the plane of said pallets, a pair of walls parallel to and mounted in spaced relation to the respective sides of said island member and supported from said island member above the plane of said pallets, said island member and said last-named wall defining therebetween a pair of longitudinal, open-topped cull-receiving passageways overlying the inner marginal portions of said pallets, and means providing a discharge outlet at one end of each of said passageways.

References Cited in the file of this patent

UNITED STATES PATENTS

| | | |
|---|---|---|
| 1,083,397 | Gilbert | Jan. 6, 1914 |
| 1,626,492 | Youngson | Apr. 26, 1927 |
| 1,755,660 | Morrow | Apr. 22, 1930 |
| 2,618,387 | Paulus | Nov. 18, 1952 |